(12) United States Patent
Daniel et al.

(10) Patent No.: US 10,853,750 B2
(45) Date of Patent: Dec. 1, 2020

(54) CONTROLLED RESOURCE PROVISIONING IN DISTRIBUTED COMPUTING ENVIRONMENTS

(71) Applicant: British Telecommunications Public Limited Company, London (GB)

(72) Inventors: Joshua Daniel, London (GB); Gery Ducatel, London (GB); Theo Dimitrakos, London (GB)

(73) Assignee: British Telecommunications Public Limited Company, London (GB)

( * ) Notice: Subject to any disclaimer, the term of this patent is extended or adjusted under 35 U.S.C. 154(b) by 494 days.

(21) Appl. No.: 15/749,391

(22) PCT Filed: Jul. 20, 2016

(86) PCT No.: PCT/EP2016/067310
§ 371 (c)(1),
(2) Date: Jan. 31, 2018

(87) PCT Pub. No.: WO2017/021155
PCT Pub. Date: Feb. 9, 2017

(65) Prior Publication Data
US 2018/0225611 A1    Aug. 9, 2018

(30) Foreign Application Priority Data
Jul. 31, 2015 (EP) .................................. 15179441

(51) Int. Cl.
*G06Q 10/06* (2012.01)
*G06F 16/27* (2019.01)
(Continued)

(52) U.S. Cl.
CPC ....... *G06Q 10/06315* (2013.01); *G06F 16/27* (2019.01); *G06F 21/6236* (2013.01);
(Continued)

(58) Field of Classification Search
CPC ................ G06F 16/27; G06F 21/6236; G06Q 10/06315; G06Q 20/065; H04L 41/50; H04L 41/5029; H04L 47/783
See application file for complete search history.

(56) References Cited

U.S. PATENT DOCUMENTS

| | | |
|---|---|---|
| 6,192,405 B1 | 2/2001 | Bunnell |
| 7,716,739 B1 | 5/2010 | McCorkendale et al. |

(Continued)

FOREIGN PATENT DOCUMENTS

| | | |
|---|---|---|
| EP | 2381363 A2 | 10/2011 |
| EP | 2101599 B1 | 9/2013 |

(Continued)

OTHER PUBLICATIONS

Combined Search and Examination Report for Great Britain Application No. 1707377.6, dated Nov. 9, 2017, 9 pages.

(Continued)

*Primary Examiner* — Jerry B Dennison
(74) *Attorney, Agent, or Firm* — Patterson Thuente Pedersen, P.A.

(57) ABSTRACT

A computer implemented method to provide allocation of one or more computing resources for a consumer computing component, each resource having a resource type and being provided by one or more resource providers, and the consumer having associated a quantity of tradeable value constraining an extent of resource consumption.

14 Claims, 3 Drawing Sheets

(51) Int. Cl.
*G06F 21/62* (2013.01)
*G06Q 20/06* (2012.01)
*H04L 12/24* (2006.01)
*H04L 12/911* (2013.01)

(52) U.S. Cl.
CPC .......... *G06Q 20/065* (2013.01); *H04L 41/50* (2013.01); *H04L 41/5029* (2013.01); *H04L 47/783* (2013.01)

(56) References Cited

U.S. PATENT DOCUMENTS

| | | | |
|---|---|---|---|
| 7,797,748 | B2 | 9/2010 | Zheng et al. |
| 7,870,153 | B2 | 1/2011 | Croft et al. |
| 8,271,974 | B2 | 9/2012 | Mazhar et al. |
| 8,375,437 | B2 | 2/2013 | Linsley et al. |
| 8,479,294 | B1 | 7/2013 | Li et al. |
| 8,516,241 | B2 | 8/2013 | Chang et al. |
| 8,739,155 | B2 | 5/2014 | Hehir et al. |
| 9,009,825 | B1 | 4/2015 | Chang et al. |
| 9,183,378 | B2 | 11/2015 | Banerjee et al. |
| 9,235,813 | B1 | 1/2016 | Qian et al. |
| 9,466,051 | B1 | 10/2016 | Roth et al. |
| 9,495,668 | B1 | 11/2016 | Juels et al. |
| 9,807,106 | B2 | 10/2017 | Daniel et al. |
| 10,680,915 | B2 * | 6/2020 | O'Brien ................ H04M 15/66 |
| 2002/0100035 | A1 | 7/2002 | Kenyon et al. |
| 2002/0120725 | A1 | 8/2002 | Dacosta et al. |
| 2003/0084349 | A1 | 5/2003 | Friedrichs et al. |
| 2003/0204644 | A1 | 10/2003 | Vincent |
| 2004/0015977 | A1 | 1/2004 | Benke et al. |
| 2004/0268296 | A1 | 12/2004 | Kayam et al. |
| 2005/0091269 | A1 | 4/2005 | Gerber et al. |
| 2006/0282660 | A1 | 12/2006 | Varghese et al. |
| 2009/0254499 | A1 | 10/2009 | Deyo |
| 2010/0011029 | A1 | 1/2010 | Niemelae |
| 2010/0262873 | A1 | 10/2010 | Chang et al. |
| 2011/0197070 | A1 | 8/2011 | Mizrah |
| 2011/0265154 | A1 | 10/2011 | Furlan et al. |
| 2012/0053925 | A1 | 3/2012 | Geffin et al. |
| 2012/0215727 | A1 | 8/2012 | Malik et al. |
| 2012/0246290 | A1 | 9/2012 | Kagan |
| 2012/0284794 | A1 | 11/2012 | Trent et al. |
| 2012/0304007 | A1 | 11/2012 | Hanks et al. |
| 2012/0311526 | A1 | 12/2012 | Deanna et al. |
| 2013/0006949 | A1 | 1/2013 | Essawi et al. |
| 2014/0067734 | A1 | 3/2014 | Hawkins et al. |
| 2014/0164251 | A1 | 6/2014 | Loh |
| 2014/0180738 | A1 | 6/2014 | Phillipps et al. |
| 2014/0215490 | A1 | 7/2014 | Mathur et al. |
| 2014/0298011 | A1 | 10/2014 | Ganesan |
| 2014/0344015 | A1 | 11/2014 | Puértolas-Montañés et al. |
| 2014/0358825 | A1 | 12/2014 | Phillipps et al. |
| 2014/0372346 | A1 | 12/2014 | Phillipps et al. |
| 2015/0120567 | A1 | 4/2015 | Van Rooyen et al. |
| 2015/0134606 | A1 | 5/2015 | Magdon-Ismail et al. |
| 2015/0227741 | A1 | 8/2015 | Permeh et al. |
| 2015/0271318 | A1 | 9/2015 | Antos et al. |
| 2015/0332283 | A1 | 11/2015 | Witchey |
| 2015/0332395 | A1 | 11/2015 | Walker et al. |
| 2015/0356523 | A1 | 12/2015 | Madden |
| 2015/0356555 | A1 | 12/2015 | Pennanen et al. |
| 2015/0363876 | A1 | 12/2015 | Ronca et al. |
| 2015/0379423 | A1 | 12/2015 | Dirac et al. |
| 2016/0048771 | A1 | 2/2016 | Chen et al. |
| 2016/0057041 | A1 | 2/2016 | Gupta et al. |
| 2016/0078367 | A1 | 3/2016 | Adjaoute |
| 2016/0086175 | A1 | 3/2016 | Finlow-Bates et al. |
| 2016/0098730 | A1 | 4/2016 | Feeney |
| 2016/0112240 | A1 * | 4/2016 | Sundaresan ............ H04W 4/90 726/1 |
| 2016/0164884 | A1 | 6/2016 | Sriram, Sr. et al. |
| 2016/0221186 | A1 | 8/2016 | Perrone |
| 2016/0260095 | A1 | 9/2016 | Ford |
| 2016/0283920 | A1 | 9/2016 | Fisher et al. |
| 2016/0350173 | A1 | 12/2016 | Ahad |
| 2017/0063886 | A1 | 3/2017 | Muddu et al. |
| 2017/0109735 | A1 | 4/2017 | Sheng et al. |
| 2017/0124534 | A1 | 5/2017 | Savolainen et al. |
| 2017/0279774 | A1 | 9/2017 | Booz et al. |
| 2017/0279818 | A1 | 9/2017 | Milazzo et al. |
| 2017/0286136 | A1 | 10/2017 | Dimitrakos et al. |
| 2018/0025166 | A1 * | 1/2018 | Daniel .................. G06F 9/5011 713/189 |
| 2018/0144114 | A1 | 5/2018 | Fiske et al. |
| 2018/0225466 | A1 | 8/2018 | Ducatel et al. |
| 2018/0225469 | A1 | 8/2018 | Daniel et al. |
| 2018/0225611 | A1 * | 8/2018 | Daniel ............. G06Q 10/06315 |
| 2018/0232526 | A1 | 8/2018 | Reid et al. |
| 2018/0285585 | A1 | 10/2018 | Daniel et al. |
| 2018/0336552 | A1 * | 11/2018 | Bohli .................. H04L 67/1097 |
| 2019/0036895 | A1 | 1/2019 | Irvine |
| 2019/0050541 | A1 | 2/2019 | Wright et al. |
| 2019/0139136 | A1 | 5/2019 | Molinari et al. |
| 2019/0354968 | A1 * | 11/2019 | Sato ..................... G06Q 20/389 |
| 2020/0073466 | A1 * | 3/2020 | Walsh ...................... H02J 7/00 |
| 2020/0177373 | A1 * | 6/2020 | Komandur ............ H04L 9/0816 |
| 2020/0183757 | A1 * | 6/2020 | Liu ........................ G06F 9/5005 |

FOREIGN PATENT DOCUMENTS

| | | |
|---|---|---|
| EP | 2816469 A1 | 12/2014 |
| EP | 3101599 A2 | 12/2016 |
| GB | 2540976 | 2/2017 |
| GB | 2540976 A | 2/2017 |
| GB | 2540977 | 2/2017 |
| GB | 2540977 A | 2/2017 |
| WO | WO-0184285 A2 | 11/2001 |
| WO | WO-2012117253 A1 | 9/2012 |
| WO | WO-2013172750 A1 | 11/2013 |
| WO | WO-2015128612 A1 | 9/2015 |
| WO | WO-2015179020 A2 | 11/2015 |
| WO | WO-2016034496 A1 | 3/2016 |
| WO | WO-2016077127 A1 | 5/2016 |
| WO | WO-2016191639 A1 | 12/2016 |
| WO | WO-2017021153 A1 | 2/2017 |
| WO | WO-2017021154 A1 | 2/2017 |
| WO | WO-2017054985 A1 | 4/2017 |
| WO | WO-2017167547 A1 | 10/2017 |
| WO | WO-2017167548 A1 | 10/2017 |
| WO | WO-2017167549 A1 | 10/2017 |
| WO | WO-2017167550 A1 | 10/2017 |
| WO | WO-2018178026 | 10/2018 |
| WO | WO-2018178034 | 10/2018 |
| WO | WO-2018178035 | 10/2018 |
| WO | WO-2018206374 | 11/2018 |
| WO | WO-2018206405 | 11/2018 |
| WO | WO-2018206406 | 11/2018 |
| WO | WO-2018206407 | 11/2018 |
| WO | WO-2018206408 | 11/2018 |
| WO | WO2018228950 | 12/2018 |
| WO | WO2018228951 | 12/2018 |
| WO | WO2018228952 | 12/2018 |
| WO | WO2018228973 | 12/2018 |
| WO | WO2018228974 | 12/2018 |

OTHER PUBLICATIONS

Combined Search and Examination Report for Great Britain Application No. 1707379.2, dated Nov. 9, 2017, 9 pages.
International Preliminary Report for Application No. PCT/EP2018/061261, dated Nov. 21, 2019, 8 pages.
International Search Report and Written Opinion for Application No. PCT/EP2018/061405, dated Jun. 20, 2018, 12 pages.
International Search Report and Written Opinion for Application No. PCT/EP2018/061406, dated Jun. 20, 2018, 13 pages.
Anonymous, "Can BitCoin be a better DRM? BitcoinBeginners," retrieved from https://www.reddit.com/r/BitcoinBeginners/commentsll y5yh8/can bitcoin be_a_better_drm, Feb. 17, 2014, 3 pages.
Anonymous, "Colored Coins—Bitcoin Wiki," Retrieved from https://en.bitcoin.it/w/index.php?title=ColoredCoins&oldid=57259, Jul. 7, 2015, 6 pages.

(56) References Cited

OTHER PUBLICATIONS

Assia Y., et al., "Colored Coins Whitepaper," 2015, available at docs.google.com/document/d/ 1AnkPcVZTCMLizw4DvsW6M8Q2JCOllzrTLuoWu2z1BE, 23 pages.
Bakshi, et al., "Securing Cloud from DDOS Attacks Using Intrusion Detection System in Virtual Machine," IEEE, 2010, 5 pages.
Bellifemine, et al., "JADE: A Software Framework for Developing Multi-Agent Applications. Lessons Learned," Elsevier, 2007, 12 pages.
Bitcoin Developer Guide, "Transactions," Retrieved from https://github.com/bitcoin-dot-org.bitcoin.org.bitcoin.org/blob/64e4c549bc5fae480e2f400c052686fd34c8fae/_includes/devdoc/guide_transactions.md, 2017, 10 pages.
Combined search and Examination Report under Sections 17 and 18(3) for Great Britain Application No. 1707376.8, dated Nov. 9, 2017, 8 pages.
Combined search and Examination Report under Sections 17 and 18(3) for Great Britain Application No. 1707378.4, dated Nov. 9, 2017, 11 pages.
Cruz J.P., et al., "The Bitcoin Network as Platform for TransOrganizational Attribute Authentication," WEB 2015, The Third International Conference on Building and Exploring Web Based Environments, XP055239598, Rome, Italy, 2015, 7 pages.
European Search Report for Application No. EP17164006.3, dated Jun. 29, 2017, 6 pages.
Extended European Search Report for Application No. 17170020.6, dated Nov. 10, 2017, 8 pages.
Extended European Search Report for Application No. 17170022.2, dated Nov. 16, 2017, 8 pages.
Extended European Search Report for Application No. 17170024.8, dated Nov. 10, 2017, 10 pages.
International Preliminary Report on Patentability for Application No. PCT/EP2015/069670, dated Mar. 16, 2017, 7 pages.
International Preliminary Report on Patentability for Application No. PCT/EP2015/069673, dated Mar. 16, 2017, 9 pages.
International Preliminary Report on Patentability for Application No. PCT/EP2016/052865, dated Aug. 24, 2017, 9 pages.
International Preliminary Report on Patentability for Application No. PCT/EP2016/067309, dated Feb. 15, 2018, 7 pages.
International Preliminary Report on Patentability for Application No. PCT/EP2017/055081, dated Oct. 11, 2018, 9 pages.
International Preliminary Report on Patentability for Application No. PCT/EP2017/055082, dated Oct. 11, 2018, 8 pages.
International Preliminary Report on Patentability for Application No. PCT/EP2018/057674, dated Oct. 10, 2019, 8 pages.
International Preliminary Report on Patentability for Application No. PCT/EP2018/057685, dated Oct. 10, 2019, 9 pages.
International Preliminary Report on Patentability for Application No. PCT/EP2018/057686, dated Oct. 10, 2019, 8 pages.
International Preliminary Report on Patentability for Application No. PCT/EP2018/061405, dated Nov. 21, 2019, 7 pages.
International Preliminary Report on Patentability for Application No. PCT/EP2018/061406, dated Nov. 21, 2019, 8 pages.
International Preliminary Report on Patentability for Application No. PCT/EP2018/061407, dated Nov. 21, 2019, 8 pages.
International Preliminary Report on Patentability for Application No. PCT/EP2018/061408, dated Nov. 21, 2019, 10 pages.
International Search Report and Written Opinion for Application No. PCT/EP2015/069670, dated Nov. 11, 2015, 8 pages.
International Search Report and Written Opinion for Application No. PCT/EP2015/069673, dated Nov. 12, 2015, 10 pages.
International Search Report and Written Opinion for Application No. PCT/EP2016/052865, dated Mar. 17, 2016, 11 pages.
International Search Report and Written Opinion for Application No. PCT/EP2016/067309, dated Nov. 3, 2016, 9 pages.
International Search Report and Written Opinion for Application No. PCT/EP2017/055081, dated Apr. 7, 2017, 11 pages.
International Search Report and Written Opinion for Application No. PCT/EP2017/055082, dated Apr. 26, 2017, 9 pages.
International Search Report and Written Opinion for Application No. PCT/EP2018/057674, dated May 2, 2018, 10 pages.
International Search Report and Written Opinion for Application No. PCT/EP2018/057685, dated Jun. 1, 2018, 9 pages.
International Search Report and Written Opinion for Application No. PCT/EP2018/057686, dated Apr. 20, 2018, 10 pages.
International Search Report and Written Opinion for Application No. PCT/EP2018/061261, dated Jun. 20, 2018, 13 pages.
International Search Report and Written Opinion for Application No. PCT/EP2018/061407, dated Jun. 20, 2018, 13 pages.
International Search Report and Written Opinion for Application No. PCT/EP2018/061408, dated Jun. 20, 2018, 15 pages.
Jin, et al., "A Guest-Transparent File Integrity Monitoring Method in Virtualization Environment," Elsevier, 2010, 11 pages.
Patel H, "A block chain based decentralized exchange," International Association for Cryptologic Research, XP061017563, Dec. 18, 2014, vol. 20141225:065012, 9 pages.
Rosenfeld M., "Overview of Colored Coins," https:1/bravenewcoin.com/assets/Whitepapers/Overview-of-Colored-Coins.pdf, Dec. 4, 2012, 13 pages.
Search Report dated Nov. 8, 2017 for Great Britain Application No. GB1707381.8, 7 pages.
Wu J., et al., "Hierarchical Temporal Memory Method for Time-Series-Based Anomaly Detection," 2016, IEEE, 16th International Conference Data Mining Workshops, XP033055893, Dec. 12, 2016, pp. 1167-1172.
Zambonelli, et al., "Agent-Oriented Software Engineering for Internet Applications," Coordination of Internet Agents: Models, Technologies, and Applications, Chapter—13, Springer, 2000, 21 pages.
Zupan B., et al., "Machine Learning by Function Decomposition," ICML 1997, Retrieved from https://citeseerxist.psu.edu/viewdoc/download?doi=10.1.1.29.4455&rep=repl&type=pdf on Oct. 17, 2017, 9 pages.
Application and Filing Receipt for U.S. Appl. No. 16/498,827, filed Sep. 27, 2019, Inventor(s): Daniel et al.
Application and Filing Receipt for U.S. Appl. No. 16/498,880, filed Sep. 27, 2019, Inventor(s): Daniel et al.
Application and Filing Receipt for U.S. Appl. No. 16/498,932, filed Sep. 27, 2019, Inventor(s): Daniel et al.
Application and Filing Receipt for U.S. Appl. No. 16/611,682, filed Nov. 7, 2019, Inventor(s): Ghanea-Hercock.
Application and Filing Receipt for U.S. Appl. No. 16/611,686, filed Nov. 7, 2019, Inventor(s): Ghanea-Hercock.
Application and Filing Receipt for U.S. Appl. No. 16/611,694, filed Nov. 7, 2019, Inventor(s): Ghanea-Hercock.
Application and Filing Receipt for U.S. Appl. No. 16/611,701, filed Nov. 7, 2019, Inventor(s): Ghanea-Hercock.
Application and Filing Receipt for U.S. Appl. No. 16/611,707, filed Nov. 7, 2019, Inventor(s): Ghanea-Hercock.
Andreas M. Antonopoulos, "Mastering Bitcoin. Unlocking Digital Crypto-Currencies." O'Reilly Media, Apr. 2014, 282 pages.
Roger Piqueras Jover et al., "dHSS—distributed Peer-to-Peer implementation of the LTE HSS based on the bitcoin/namecoin architecture," 2016 IEEE International Conference on Communications Workshops (ICC), IEEE, May 23, 2016, pp. 354-359, XP032919891, DOI: 10.1109/ICCW.2016.7503813.
Tomoyuki Sanda et al., "Proposal of new authentication method in Wi-Fi access using Bitcoin 2.0," 2016 IEEE 5$^{th}$ Global Conference on Consumer Electronics, IEEE, Oct. 11, 2016, pp. 1-5, XP033032268, DOI: 10.1109/GTCCE.2016.78000479.
Deloitte, "Blockchain © Telco How blockchain can impact the telecommunications industry and its relevance to the C-Suite Introduction to blockchain," 28 Nov. 28, 2016, XP0555394340, Retrieved from the Internet: URL: https://www2.deloitte.com/content/dam/Deloitte/za/Documents/technology-media-telecommunications/za_TMT_Blockchain_TelCo.pdf [retrieved Jul. 27, 2017] p. 9-p. 20.
"A Next-Generation Smart Contract and Decentralized Application Platform" Ethereum White Paper, 2016, retrieved from https://github.com/ethereum/wiki/wiki/White-Paper.
Ahmad S., et al., "How Do Neurons Operate on Sparse Distributed Representations? A Mathematical Theory of Sparsity, Neurons and Active Dendrites," available from Cornell University Library (cita-

(56) References Cited

OTHER PUBLICATIONS tion arXiv: 1601.00720) and https://arxiv.org/ftp/arxiv/papers/1601/1601.00720.pdf, retrieved on Mar. 28, 2018, 23 pages.

Ahmad S., et al., "Properties of Sparse Distributed Representations and their Application to Hierarchical Temporal Memory," available from Cornell University Library (citation arXiv: 1503.07469) and https://arx.iv.org/ftp/arx.iv/papers/1503/1503.07469.pdf, retrieved on Mar. 28, 2018, Numenta, Redwood City, CA, USA, Mar. 24, 2015, 18 pages.

Ahmad S., et al., "Real-Time Anomaly Detection for Streaming Analytics," available from Cornell University Library (citation arXiv: 1607.02480) and https://arxiv.org/pdf/1607.02480.pdf, retrieved on Mar. 28, 2018, Numenta, Inc., Redwood City, CA, USA, Jul. 8, 2016, 10 pages.

Anonymous: "Who will protect users from ethereum based malware? : ethereum" Mar. 28, 2016 XP055306678, Retrieved from the Internet: URL: https://www.reddit.com/r/ethereum/comments/4ccfaa/who_will_protect_users_from_ethereum_based_malware/?st=itbp2q49&sh=d8cc4355 on Sep. 29, 2016.

International Preliminary Report on Patentability for Application No. PCT/EP2017/055090, dated Oct. 11, 2018, 10 pages.

International Preliminary Report on Patentability for Application No. PCT/EP2017/055091, dated Oct. 11, 2018, 9 pages.

International Search Report and Written Opinion for Application No. PCT/EP2017/055095, dated Apr. 11, 2017, 10 pages.

International Preliminary Report on Patentability for Application No. PCT/EP2017/055095, dated Oct. 11, 2018, 8 pages.

U.S. Appl. No. 15/749,289, filed Jan. 31, 2018, Inventor: Ducatel et al.

U.S. Appl. No. 15/749,338, filed Jan. 31, 2018, Inventor: Ducatel et al.

Application and Filing Receipt for U.S. Appl. No. 15/223,261, filed Jul. 29, 2016, Inventor: Daniel et al, 182 pages.

Application and Filing Receipt for U.S. Appl. No. 15/548,654, filed Aug. 3, 2017, Inventor: Daniel et al, 195 pages.

Application and Filing Receipt for U.S. Appl. No. 15/939,650, filed Mar. 29, 2019, Inventor(s): Daniel et al.

Adler M., "Threat Intelligence Visibility—the way forward," BT, 2015, available from www.globalservices.bt.com/uk/en/products/assure threat_ monitoring.

Billaudelle S., et al., "Porting HTM Models to the Heidelberg Neuromorphic Computing Platform," available from Cornell University Library (citation arXiv: 1505. 02142), retrieved on Mar. 28, 2018, from https://arx.iv.org/pdf/1505.02142.pdf, Kirchhoff-Institute for Physics, May 2015, 9 pages.

Biryukov A., et al., "University of Luxembourg" Jan. 19, 2016, XP055306767, Luxemburg, retrieved from URL:http://wwwfr.uni.lu/snt/news_events/speaker_s_presentations on Sep. 29, 2016, pp. 5 and 29.

Bonneau J., et al., "Research Perspectives and Challenges for Bitcoin and Cryptocurrencies," International Association for Cryptologic Research, Mar. 19, 2015, 18 pages.

Application as filed for U.S. Appl. No. 16/086,109, filed Sep. 18, 2018, Inventor(s): Daniel et al.

Cui, et al., "Continuous Online Sequence Learning with an Unsupervised Neural Network Model," Published in Neural Computation and available from https://www.mitpressjournals.org/doi/pdf/10.1162/NECOa_00893, retrieved on Mar. 28, 2018, Numenta Inc., Redwood City, CA, USA, Nov. 2016, vol. 28 (11), 31 pages.

Cui, et al., "The HTM Spatial Pooler: A Neocortical Algorithm for Online Sparse Distributed Coding," available from Cold Spring Harbor Laboratory bioRxiv (citation doi.org/10.1101/085035) and https://www.biorxiv.org/content/biorxiv/early/2017/02/16/085035.full.pdf, retrieved on Mar. 28, 2018, Numenta Inc., Redwood City, CA, USA, Feb. 3, 2017, 16 pages.

Application as filed for U.S. Appl. No. 16/086,087, filed Sep. 18, 2018, Inventor(s): Smith et al.

Extended European Search Report for Application No. EP15179440.1, dated Feb. 10, 2016, 6 pages.

Fischer A., et al., "An Introduction to Restricted Boltzmann Machines," in: Progress in Pattern Recognition, Image Analysis, Computer Vision and Applications, vol. 7441 of the series Lecture Notes in Computer Science, 2012, pp. 14-36.

Application as filed for U.S. Appl. No. 16/086,074, filed Sep. 18, 2018, Inventor(s): Daniel et al.

Hawkins, et al., in "On Intelligence, How a New Understanding of the Brain Will Lead to the Creation of Truly Intelligent Machines," Times Books, ISBN 0-8050-7 456-2, 2004, 174 pages.

Hawkins, et al., "Why Neurons Have Thousands of Synapses, A Theory of Sequence Memory in Neocortex," Published in Frontiers in Neural Circuits (10 (2016) 1-13, doi:10.3389/fncir.2016.00023) and available from https://www.frontiersin.org/articlesll0.3389/fncir.2016.00023/full, retrieved on Mar. 28, 2018, Numenta Inc., Redwood City, CA, USA, Mar. 30, 2016, 13 pages.

Application as filed for U.S. Appl. No. 16/086,058, filed Sep. 18, 2018, Inventor(s): Daniel et al.

International Search Report and Written Opinion for Application No. PCT/EP2017/055090, dated Jun. 14, 2017, 12 pages.

International Search Report and Written Opinion for Application No. PCT/EP2017/055091, dated Apr. 11, 2017, 11 pages.

Lavin, et al., "Evaluating Real-time Anomaly Detection Algorithms, the Numenta Anomaly Benchmark," available from Cornell University Library (citation archive:1510.03336) https://arxiv.org/ftp/arxiv/papers/1510/1510.03336.pdf, retrieved on Mar. 28, 2018, Numenta, Inc., Redwood City, CA, USA, Oct. 9, 2015, 8 pages.

Miller A., "The State-of-the-Art of Smart Contracts" Jan. 19, 2016, XP055306766, Luxemburg retrieved from the Internet: URL: http://wwwfr.uni.lu/snt/news_events/speaker_s_presentations on Sep. 29, 2016, pp. 7-8, 16 and 18.

Numenta, "Biological and Machine Intelligence (BAMI), A living book that documents Hierarchical Temporal Memory (HTM)," Numenta, Inc., Mar. 8, 2017, retrieved on Mar. 28, 2018 from https://numenta.com/assets/pdf/biological-and-machine-intelligence/BAMIComplete.pdf, 69 pages.

Numenta, "Hierarchical Temporal Memory including HTM Cortical Learning Algorithms," Version 0.2.1, Numenta, Sep. 12, 2011, 68 pages.

Numenta, "Sparse Distributed Representations," (Numenta, available from https://numenta.com/assets/pdf/biological-and-machine-intelligence/BaMISDR.pdf and accessed on Mar. 29, 2017, retrieved on Mar. 28, 2018, 15 pages.

International Search Report and Written Opinion for PCT Application No. PCT/EP2016/067308, dated Sep. 21, 2016, 8 pages.

International Preliminary Report on Patentability for Application No. PCT/EP2016/067308, dated Feb. 15, 2018, 7 pages.

Olshausen, et al., "Sparse Coding with an Overcomplete Basis Set, A Strategy Employed by VI?" Olshausen, B.A., Field, D.J., 1997, Vision Research, 37:3311-3325) retrieved on Mar. 28, 2018 from http://www.chaos.gwdg.de/michael/CNScourse_2004/papersmax/OlshausenFieldl997.pdf, Dec. 24, 1996, 15 pages.

Plohmann D., et al., "Case study of the Miner Botnet", Cyber Conflict (CYCON), 2012 4th International Conference on Jun. 5, 2012, pp. 1-16.

Shah S.Y., et al., "Price Based Routing for Event Driven Prioritized Traffic in Wireless Sensor Networks," Apr. 29-May 1, 2013, IEEE 2nd Network Science Workshop, XP032487185, 8 pages.

Purdy S., "Encoding Data for HTM Systems," Available from Cornell University Library (citation arXiv: 1602.05925), retrieved on Mar. 28, 2018 from https://arx.iv.org/ftp/arx.iv/papers/1602/1602.05925.pdf, Numenta, Inc., Redwood City, California, USA, Feb. 2016, 11 pages.

Sood A.K., et al., "An Empirical Study of HTTP-based Financial Botnets," IEEE Transactions on Dependable and Secure Computing, IEEE Service Center, New York, NY, US, vol. 13 (2), Mar. 2016, pp. 236-251.

International Preliminary Report on Patentability for Application No. PCT/EP2017/055094, dated Oct. 11, 2018, 8 pages.

International Search Report and Written Opinion for Application No. PCT/EP2017/055094, dated May 15, 2017, 10 pages.

International Preliminary Report on Patentability for Application No. PCT/EP2016/067310, dated Feb. 15, 2018, 8 pages.

(56) References Cited

OTHER PUBLICATIONS

Asmi E.A.K., et al., "Bitcoin-Based Decentralized Carbon Emissions Trading Infrastructure Model," Systems Engineering, Mar. 2015, vol. 18 (2), Retrieved from the Internet: URL: https://www.researchgate.net/publication/268686553, 15 pages.

Tschorsch F., et al., "Bitcoin and Beyond: A Technical Survey on Decentralized Digital Currencies," International Association for Cryptologic Research, May 15, 2015, pp. 1-37.

Wang Z., "The Applications of Deep Learning on Traffic Identification," 2015.

Wikipedia, "Block chain (database)—Wikipedia, the free encyclopedia", Nov. 29, 2015, retrieved from the Internet: URL: https://en.wikipedia.org/w/index.php?title=Block_chain_(database)oldid=692921608.

International Search Report for corresponding International Application No. PCT/EP2016/067310 dated Sep. 22, 2016; 3 pages.

Written Opinion of the International Searching Authority for corresponding International Application No. PCT/EP2016/067310 dated Sep. 22, 2016; 6 pages.

Jesse E Grushack et al: "Union College Currency 3.0: Examining Digital Crypto Currency Markets", Jun. 30, 2014 (Jun. 30, 2014), XP055242356, Retrieved from the Internet: URL: http://antipasto.union.edu/engineering/Archives/SeniorProjects/2014/CS.2014/filers/grushacj/grushacj_paper.pdf; 44 pages.

Enas Al Kawasmi et al: "Bitcoin-Based Decentralized Carbon Emissions Trading Infrastructure Model", Systems Engineering, vol. 18, No. 2, Sep. 28, 2014 (Sep. 28, 2014), XP055242445, ISSN: 1098-1241, DOI: 10.1002/sys.21291, Retrieved from the Internet: URL: https://www.researchgate.net/publication/26866553_Bitcoin-Based_Decentralized_Carbon_Emissions_Trading_Infrastructure_Model; 15 pages.

Dr Gavin Wood: "Ethereum: A Secure Decentralized Generalized Transaction Ledger Final Draft—Under Review", Jun. 4, 2014 (Jun. 4, 2014), XP055242189, Retrieved from the Internet: URL:http://gavwood.com/paper.pdf; 32 pages.

Jacob Stenum Czepluch et al: "The Use of Block Chain Technology in Different Application Domains", May 20, 2015 (May 20, 2015), XP055242451, Retrieved from the Internet: URL:http://www.lollike.org/bachelor.pdf; 109 pages.

Andreas M. Antonopoulos; Mastering Bitcoin. Unlocking Digital Crypto-Currencies. Early Release Raw & Unedited; Dec. 2014 First Edition; ISBN: 978-1-449-37404-4; https://unglueit-files.s3.amazonaws.com/ebf/05db7df4f31840f0a873d6ea14dcc28d.pdf (O'Reilly Media, Apr. 2014); 282 pages.

Benders, J., Numerische Mathematik; "Partitioning Procedures for Solving Mixed Variables Programming Problems", 4, 238-252, 1962; 8 pages.

Chaisiri, Lee and Niyato, "Optimization of Resource Provisioning Cost in Cloud Computing" IEEE Transactions on Services Computing, vol. 5, No. 2, Apr.-Jun. 2012); 14 pages.

\* cited by examiner

CONTROLLED RESOURCE PROVISIONING IN DISTRIBUTED COMPUTING ENVIRONMENTS

CROSS-REFERENCE TO RELATED APPLICATIONS

The present application is a National Phase entry of PCT Application No. PCT/EP2016/067310, filed on Jul. 20, 2016, which claims priority to EP Patent Application No. 15179441.9, filed on Jul. 31, 2015, which are hereby fully incorporated herein by reference.

TECHNICAL FIELD

The present disclosure invention relates to the provision of resources. In particular it relates to the provision of resources in distributed computing environments.

BACKGROUND

Distributed computing environments are environments in which computer systems, services and/or resources (whether hardware, software or a combination) are distributed physically and/or virtually with a dependence on communications networks for interoperability. Further, there is increasing deployment of software installations such as applications or entire virtualized computer systems to service based environments, such as Infrastructure as a Service (IaaS), Platform as a Service (PaaS) and cloud computing environments.

Software installations such as virtualized computer systems, cloud computing deployments and the like, implement functional requirements as part of the installation. For example functional requirements can include: security functionality such as anti-malware, encryption, firewall or intrusion detection; communications functionality such as network communication, encrypted or otherwise secure communication; operating system services and functions; data storage facilities including disk, memory, database and the like; middleware services such as message handling, transaction handling and the like; and other functional requirements. Functional requirements themselves employ computing resources such as storage, processors, security functions, communication resources such as networking and the like that are increasingly provided by "supplier" or "provider" entities (whether third-party or not) either as actual resources or virtualized resources. Thus in implementing or providing a functional requirement a software installation consumes requisite computing resources from resource providers. The consumption of such resources can be based on resource reservation, dynamic, on-demand and/or dynamically scalable. Resource providers and consumers in such environments can be unrelated, anonymous, untrusted and/or unknown to each other.

A challenge arises for a resource consumer such as a cloud computing consumer having a virtual machine specification for implementation. Such a resource consumer must procure computing resource to implement functional requirements. It is necessary to identify resource providers able to satisfy the resource requirements to, in turn, satisfy the particular functional requirements. Multiple such resource providers may be identified for each resource. Resource providers can provision resource in different ways and with different associated costs. An on-demand approach to resource provisioning provides access to resources by resource consumers as required without prior reservation. To accommodate such an approach to resource provisioning resource providers must employ scalable architectures and may operate with costly redundancy when demand is low. Accordingly these additional burdens on resource providers are shared with resource consumers by imposing higher cost. An alternative approach to resource provisioning is reservation-based provisioning in which resource consumers arrange resource provision in advance of consumption. This provides certainty for resource providers and so the costs to consumers are lower. However, reservation-based provisioning is susceptible to over or under consumption by resource consumers where resource planning or load forecasting is not effective or accurate. These challenges for resource providers and consumers are compounded where resource demand across all consumers and the cost of providing resources varies over time.

SUMMARY

Accordingly it would be beneficial to provide for the consumption of resource by resource consumers in a way that mitigates these challenges.

The present disclosure accordingly provides, in a first aspect, a computer implemented method to provide allocation of one or more computing resources for use by a consumer computing component, each resource having a resource type and being provided by one or more resource providers, and the consumer having associated a quantity of tradeable value constraining an extent of resource consumption, the method comprising: defining one or more consumption rules for each of the resource providers, each consumption rule being associated with the consumer and defining: a type of resource; and one or more tradeable values corresponding to costs for consumption of resource, each tradeable value being associated with a particular configuration of the resource, wherein the consumption rules are recorded in a blockchain data structure; defining an optimization rule associated with the consumer and including: a reference to each of the consumption rules associated with the consumer; a definition of one or more constraints on characteristics of resources; and a consumption optimization function, wherein the optimization rule is recorded in the blockchain, wherein, in use, a transaction is submitted to the blockchain to trigger consumption of one or more required types of resource and responsive to the transaction the optimization rule determines one or more resource providers for providing resources of the required resource types and, for each determined provider, the optimization function determines, based on the consumption rules, a particular configuration and an extent of consumption of each type of resource so as to control expenditure of the consumer's tradeable value.

In some embodiments the optimization rule further includes one or more constraints on expenditure of the consumer's tradeable value.

In some embodiments the optimization rule effects consumption of resource by causing invocation of one or more consumption rules for the consumer corresponding to the one or more determined resource providers.

In some embodiments the invocation of each of the one or more consumption rules effects a change to the quantity of tradeable value of the consumer.

In some embodiments each of the one or more consumption rules are executable by miner software components operating with the blockchain data structure.

In some embodiments the one or more consumption rules are contracts defined in a smart contract blockchain system.

In some embodiments the optimization rule is a contract defined in a smart contract blockchain system.

In some embodiments the optimization rule responsive to the transaction is executed repeatedly so as to continuously adapt resource consumption.

In some embodiments the optimization rule is executable by miner software components operating with the blockchain data structure.

In some embodiments the optimization rule is executed by a central computer system.

In some embodiments the determinations of the optimization rule responsive to the transaction are repeated based on one or more of: changes to the consumer's quantity of tradeable value; and changes to a tradeable value, in one or more consumption rules, corresponding to a cost for consumption of resource.

In some embodiments a consumption rule evaluates a tradeable value for consumption of a resource with reference to an interface to a service provider for the resource, the interface providing a dynamic tradeable value rate for the resource.

The present disclosure accordingly provides, in a second aspect, a computer system to provide allocation of one or more computing resources for use by a consumer computing component, each resource having a resource type and being provided by one or more resource providers, and the consumer having associated a quantity of tradeable value constraining an extent of resource consumption, the system comprising a processor and a data store wherein the processor is adapted to undertake the following: defining one or more consumption rules for each of the resource providers, each consumption rule being associated with the consumer and defining: a type of resource; and one or more tradeable values corresponding to costs for consumption of resource, each tradeable value being associated with a particular configuration of the resource, wherein the consumption rules are recorded in a blockchain data structure; defining an optimization rule associated with the consumer and including: a reference to each of the consumption rules associated with the consumer; a definition of one or more constraints on characteristics of resources; and a consumption optimization function, wherein the optimization rule is recorded in the blockchain, wherein, in use, a transaction is submitted to the blockchain to trigger consumption of one or more required types of resource and responsive to the transaction the optimization rule determines one or more resource providers for providing resources of the required resource types and, for each determined provider, the optimization function determines, based on the consumption rules, a particular configuration and an extent of consumption of each type of resource so as to control expenditure of the consumer's tradeable value.

The present disclosure accordingly provides, in a third aspect, a computer program element comprising computer program code to, when loaded into a computer system and executed thereon, cause the computer to perform the method as described above.

BRIEF DESCRIPTION OF THE DRAWINGS

An embodiment of the present disclosure will now be described, by way of example only, with reference to the accompanying drawings, in which.

DETAILED DESCRIPTION

Figure 1:
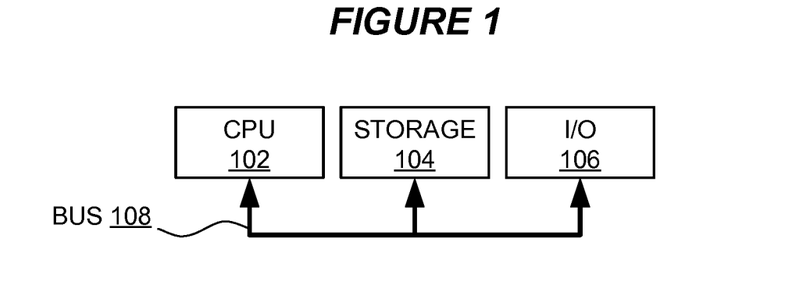
FIG. 1 is a block diagram of a computer system suitable for the operation of embodiments of the present disclosure.

FIG. 1 is a block diagram of a computer system suitable for the operation of components in embodiments of the present disclosure. A central processor unit (CPU) 102 is communicatively connected to storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
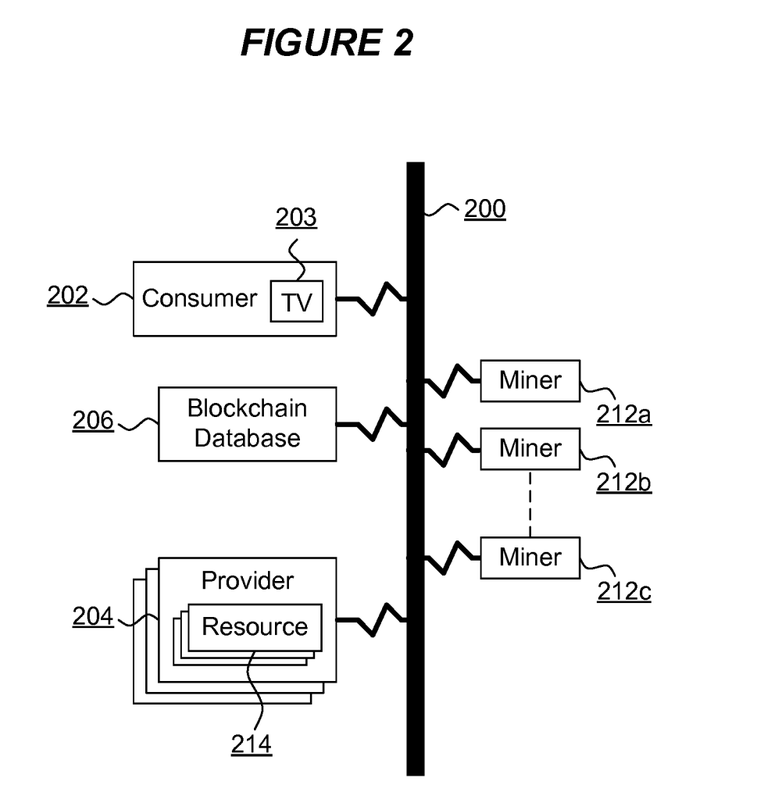
FIG. 2 is a component diagram of an exemplary computer system arrangement for provisioning resource to a consumer computing component in accordance with an embodiment of the present disclosure.

FIG. 2 is a component diagram of an exemplary computer system arrangement for provisioning resource to a consumer computing component 202 in accordance with an embodiment of the present disclosure. The consumer 202 is a software, hardware, firmware or combination component adapted to consume computing resource. For example, the consumer 202 is a virtual machine specification or a virtual machine for instantiation and operation in a virtualized computing environment and requiring computing resources for execution, such as processor, storage, networking, input/output or other computing resource. Consumption of resource is compensated by expenditure of a tradeable value 203 associated with the consumer 202. Thus the consumer 202 has associated a quantity of tradeable value 203, such as a numerical representation of value or a balance. Consumption of a resource involves expenditure of the tradeable value 203 and thus the quantity of tradeable value 203 associated with the consumer 202 constitutes a constraint on an extent of resource consumption by the consumer 202. In one embodiment the tradeable value 203 is a cryptocurrency value or a fiat value.

The consumer 202 is connected to a computer network 200 such as by a wired, wireless, physical or virtual network. Accordingly the consumer 202 is communicatively connected to the other components of FIG. 2 as described below. The network 200 is depicted as a single continuous entity though it will be appreciated that the network 200 could have any communications network topology and/or arrangement. In some embodiments the network 200 is a series of communicatively connected networks or a logical arrangement of networks or subnetworks operating over potentially numerous underlying physical networks. In some embodiments the network 200 is the internet.

The arrangement of FIG. 2 further includes one or more resource provider computer systems 204 each connected to the network 200. Providers 204 are hardware, software, firmware or combination components adapted to provide computing resources 214 for consumption by the consumer 202. For example, a provider 204 can be a cloud computing service offering processor, memory, storage, database, networking or other computing resources. Each resource 214 has a resource type as a class or type of resource. For example, multiple different microprocessor resources or virtualized processing component resources could have the type "processor". Notably each resource provider 204 may provide multiple resources 214 which may be of the same or different types or a mixture. Such resources may not be physical resources and may alternatively be virtualized such as virtual storage. Such virtualization can include simulation or emulation of resources or virtual implementations of physical resources. In some embodiments a resource 214 is not local to a provider 204 and the provider 204 acts as an agent, proxy, router or link to a resource. For example, in one embodiment a provider 204 is a resource agent that provides resources hosted by other computing entities communicatively connected to the provider 204 over the network 200 or a different network or communication means.

The arrangement of FIG. 2 further includes a blockchain database 206 as a sequential transactional database that may be distributed and is communicatively connected to network 200. Furthermore, the arrangement of FIG. 2 includes a plurality of miner computing components 212a, 212b, 212n. Distributed sequential transactional databases are well known in the field of cryptocurrencies and are documented, for example, in "Mastering Bitcoin. Unlocking Digital Crypto-Currencies." (Andreas M. Antonopoulos, O'Reilly Media, April 2014). For convenience, such a database is herein referred to as a blockchain 206 though it will be appreciated that other suitable databases, data structures or mechanisms possessing the characteristics essential for embodiments of the present invention could alternatively be used. The blockchain 206 is a distributed chain of block data structures accessed by a network of nodes, referred to here as a network of miners 212. Each block in the blockchain 206 includes a plurality of transaction data structures. For example, in a preferred embodiment each blockchain includes a Merkle tree of hash or digest values for transactions included in the block to arrive at a hash value for the block, which is itself combined with a hash value for a preceding block to generate a chain of blocks (blockchain). A new block of transactions is added to the blockchain by miner 212 software, hardware, firmware or combination systems in the miner network. The miners 212 are communicatively connected to sources of transactions (such as the consumer 202) and access or copy the blockchain 206. A miner 212 undertakes validation of the substantive content of a transaction (such as the criteria defined therein) and adds a block of new transactions to the blockchain when a challenge is satisfied, typically such challenge involving a combination hash or digest for a prospective new block and a preceding block in the blockchain and some challenge criterion. Thus miners 212 in the miner network may each generate prospective new blocks for addition to the blockchain 206. Where a miner 212 satisfies or solves the challenge and validates the transactions in a prospective new block such new block is added to the blockchain 206. Accordingly the blockchain 206 provides a distributed mechanism for reliably verifying a data entity such as an entity constituting or representing the potential to consume a resource.

While the detailed operation of blockchains and the function of miners 212 in the miner network are beyond the scope of this specification, the manner in which the blockchain 206 and network of miners 212 operate ensures that only valid transactions are added within blocks to the blockchain 206 in a manner that is persistent within the blockchain 206. Transactions added erroneously or maliciously are not verifiable by other miners 212 in the network and do not persist in the blockchain. This attribute of blockchains is exploited by embodiments of the present disclosure to provide a distributed and reliable assurance for resource providers 204 and resource consumer 202 to improve efficiency of resource consumption. Thus transactions submitted for recordal in the blockchain 206 are passed to the miner network for validation by miners 212 as prospective new blocks. Validated blocks are added to the blockchain 206 by the miner network. Blocks added to the blockchain 206 that are invalid (due to error or malice) do not persist in the blockchain in favor or blocks verifiable by other miners in the network. Thus after a period of time (the length of which can be tailored by, for example, adapting the complexity of the challenge required to demonstrate proof of work by the miners 212 as part of the creation of new blocks), a new block is confirmed in the blockchain 206 at which time entities utilizing the blockchain 206 can operate with certainty that transactions in the confirmed block are valid and verifiable.

In one embodiment the arrangement of FIG. 2 is implemented within one or a number of closely coupled computer systems and the network 200 is provided as a communication means between the various components of FIG. 2 such as a communications bus or the like. In some embodiments the arrangement of FIG. 2 is implemented in a controlled environment (for example a non-public environment) such that the blockchain is accessible to the other components that also execute in the controlled environment. For example, the arrangement could be implemented within a single organization or a group of collaborating organizations using an intranet of the organization(s).

Figure 3:
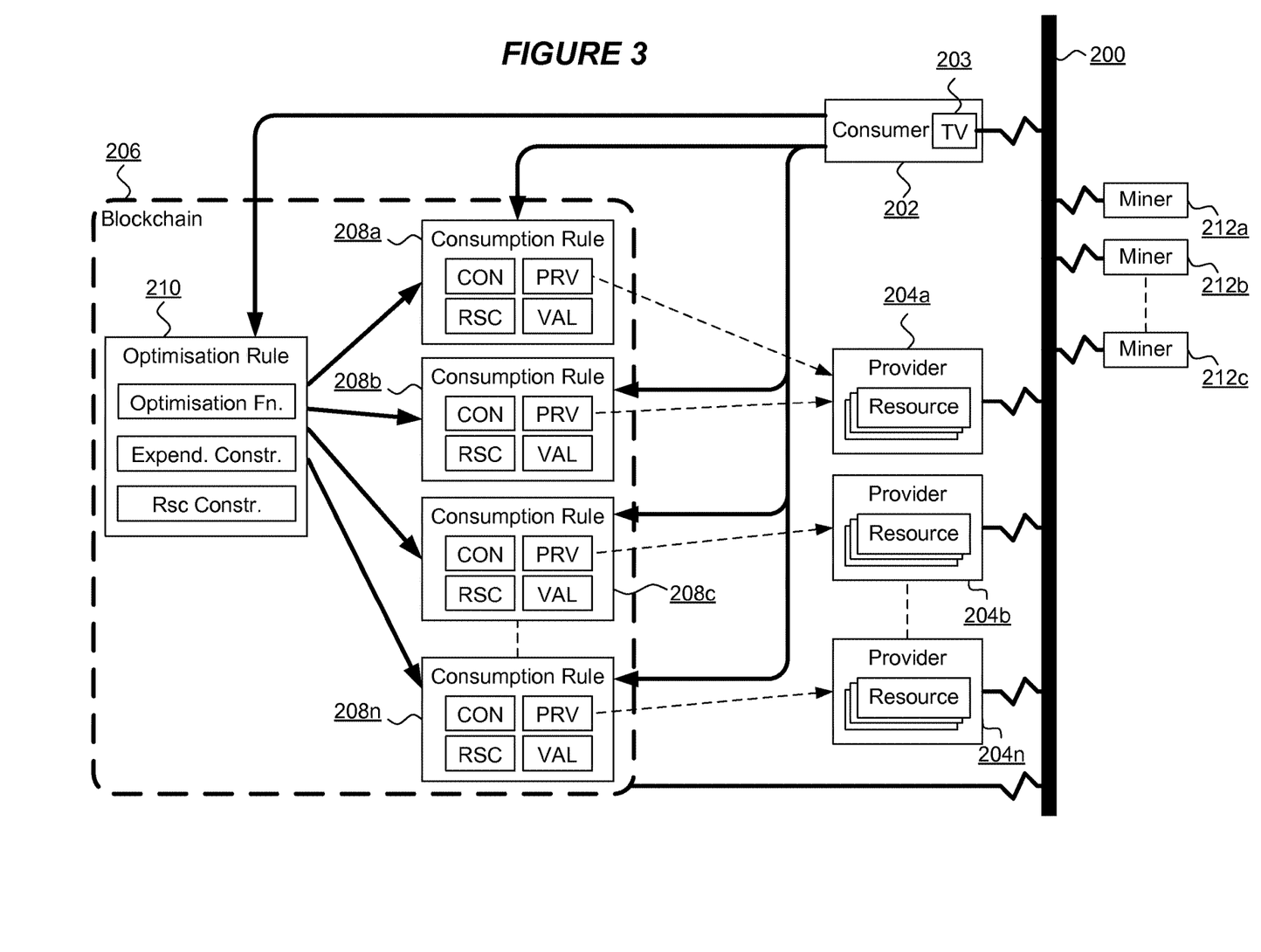
FIG. 3 is a component diagram illustrating the exemplary arrangement of FIG. 2 in use in accordance with an embodiment of the present disclosure.

The arrangement of FIG. 2 is arranged to provide at least some of resources 214 for use by the consumer 202 in such a way as to control the expenditure of the consumer's tradeable value as will be described with respect to FIG. 3. FIG. 3 is a component diagram illustrating the exemplary arrangement of FIG. 2 in use in accordance with an embodiment of the present disclosure. Many of the elements of FIG. 3 are identical to those described above with respect to FIG. 2 and these will not be repeated here.

Initially the consumer 202 defines one or more consumption rules 208 as a data structure for storage in the blockchain 206. Each consumption rule 208 is provided in response to an agreement or determination that a provider 204 can provide access to a resource 214. Such determination includes a definition of, or a mechanism for determining, a cost of consumption of the resource 214. Thus, provider 204a may agree to supply consumer 202 with access to a virtualized processor resource having a particular processing performance (e.g. processing throughput). The provider 204a may define a fixed cost for consumption of the processor resource and a consumption rule 208 can be defined to identify the resource and the cost. Alternatively, in a context where the cost of consumption of the processor resource is variable, the provide 204a may provide an interface such as an application programming interface via which an up-to-date cost for consumption of the resource can be obtained. For example, cost can vary temporally, based on resource load, provider capacity and the like. Furthermore, the provider 204 may offer variants of the virtualized processor resource, such as a virtualized processor resource having different configurations. For example the provider 204 may offer multiple virtualizations of different physical processors and/or access to actual physical processors, with all such resources being processors and so belonging to the same resource type. Each configuration of the resource may have a different associated cost that can be reflected in consumption rules 208.

Accordingly a consumption rule 208 defines logic for validating consumption by a consumer 202 ("CON") of one or more resources of a resource provider 204 ("PRV"). The validation is undertaken by the definition of logical rules within the consumption rule 208 that reflect the requirements of the consumer 202, such as preferences of the consumer 202 or a user of the consumer 202 or policy or other requirements of the consumer 202, such as organizational policy, security policy, performance requirements and the like. In one embodiment the logical rules are implemented in executable program code and serve to test attributes of a proposal to consume a resource for satisfaction of the rules. Logical rules identify a particular type of resource ("RSC") and define a particular or range of costs for consumption of a resource (i.e. tradeable values corresponding to costs for consumption of the resource, "VAL"). For example, the consumer 202 may have a requirement to consume communication network resource. Accordingly, the consumer negotiates with a provider, such as provider 204a, and defines a consumption rule 208a identifying a resource type (communications network) and resource consumption costs imposed by the provider 204a. Such costs can be associated with one or more particular configurations of the resource. Thus where the provider 204a offers communication network resource at multiple performance levels (e.g. multiple data transfer speeds), each performance level constituting a configuration of the resource can have associated a different cost.

Each consumption rule 208 also includes logic for effecting expenditure of tradeable value 203 when consumption is validated in response to a consumption transaction or message. Thus, in use, a transaction submitted to the blockchain 206 for, or a message received directly by, a particular consumption rule 208a (such as by reference to an address of the consumption rule 208a) and including transaction/message parameters indicating consumption of a particular resource, will be received and validated by the consumption rule 208a. If the parameters are validated by the consumption rule 208a (i.e. the consumption is valid and the rule is satisfied) then the consumption rule 208a effects expenditure of the consumer's 202 tradeable value 203. Expenditure can be affected by reducing the tradeable value 203 typically with a corresponding increase in a tradeable value for a resource provider 204 providing the consumed resource. The execution of the consumption rule 208a will be undertaken by miners 212 as part of the mining process.

Figure 4:
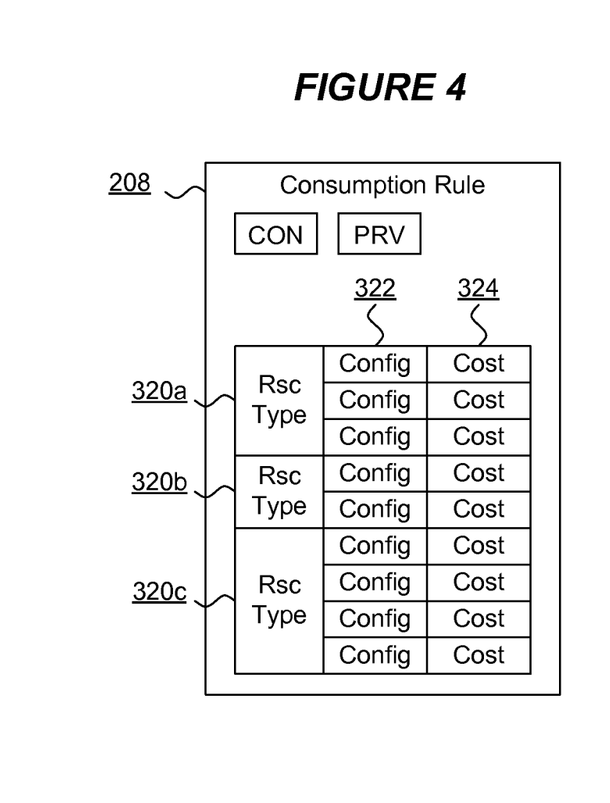
FIG. 4 is a schematic illustration of a consumption rule in accordance with an embodiment of the present disclosure.

FIG. 4 is a schematic illustration of an exemplary consumption rule 208 in accordance with an embodiment of the present disclosure. The consumption rule 208 includes an identification of the consumer 202 ("CON") and a resource provider 204 ("PRV"). The consumption rule 208 further includes a list of resource types 320a, 320b, 320c agreed for provisioning by the provider 204 to the consumer 202. For example, resource types include processor, storage, communication etc. Each resource type includes a resource configuration 322 and a cost 324. Notably the cost 324 could be provided by way of an interface to real-time cost information. Multiple consumption rules 208a, 208b, 208c, 208n can be defined by the consumer 202 for resources of the providers 204. Notably, multiple consumption rules 208 for the same type of resource can be provided, such as where each rule corresponds to a different provider of the resource type.

Returning to FIG. 3, the consumer 202 further defines an optimization rule 210 as a data structure for storage in the blockchain 206. The optimization rule 210 includes a reference, link or other mechanism for access to each of the consumption rules 208 for the consumer 202, such as an address for each of the consumption rules 208 in a storage of the blockchain system. The optimization rule 210 includes constraint definitions such as rules defining constraints specific to the consumer 202 on the characteristics of resources, such as characteristics of particular resource types. In some embodiments the optimization rule 210 further includes constraint definitions defining constraints specific to the consumer 202 on expenditure of the consumer's 202 tradeable value 203, such as a limit to the extent or rate of expenditure or a relationship between expenditure rules and characteristics of resource types. In this way the expenditure of the consumer's 202 tradeable value 203 by the consumption of resources 214 is bounded by the constraints.

Constraints on characteristics of resources can include definitions of minimum and/or maximum service levels, qualities, configurations or attributes of resources. Additionally or alternatively constraints on characteristics of resources can include rules defining characteristics of certain resources or resource types in dependence on characteristics of other resources or resource types or even in dependence on an amount or proportion of tradeable value 203, such as an amount of tradeable value 203 available. For example, where the consumer 202 has resource requirements for network communication resource and data storage resource, the optimization rule 210 can define a resource constraint that requires data storage resource of higher capacity when a network communication resource is provided having a high data rate (so as to ensure capacity to store data communicated via the communication resource, for example). In another example, a constraint on a maximum data rate for a network communication resource may cause a reduction in data rate when a quantity of tradeable value 203 of the consumer 202 falls below a predetermined threshold. In this way a detection of a low balance of tradeable value 203 can lead to a reduction in a rate of expenditure by transitioning to lower cost resources. Other resource characteristic constraints will be apparent to those skilled in the art.

Constraints on expenditure of the consumer's 202 tradeable value 203 can be dependent on, associated with or related to resource characteristics, resource configurations, resource constraints or the quantity, balance or rate of expenditure of tradeable value itself. For example, a maximum tradeable value that can be expended on a communication resource may be defined differently for communication resources of different data rates, with higher data rates enjoying a greater maximum tradeable value.

For example, the consumer 202 may have a policy requirement that network resource must have a configuration that provides a particular performance, such as a minimum data transfer speed. Further, the consumer 202 may have a policy requirement that the network resource must not exceed a particular cost, such cost affecting the consumer 202 by expenditure of the tradeable value 203. Such requirements of the consumer 202 are reflected in the optimization rule 210 as constraints.

The optimization rule 210 further includes an optimization function as executable logic for controlling expenditure of the consumer's 202 tradeable value 203 by determining resources for consumption by the consumer 202, particular configurations of the resources and an extent of consumption of each resource. In some embodiments it is an overriding objective of the optimization function to determine resources and configurations of resources for consumption by the consumer 202 that satisfy the constraints of the optimization rule 210 (the resource constraints and, in some embodiments, the expenditure constraints) while minimizing the expenditure of tradeable value 203 so as, for example, to provide for the longest duration of consumption for the tradeable value 203. Other optimization objectives could alternatively be defined for the optimization function as will be apparent to those skilled in the art. For the avoidance of doubt, while the term "optimization function" and "optimization rule" are used in this specification, such function and rule may not obtain a definitive optimal solution and the terms "optimal", "optimization" and "optimum" are to be interpreted as indicating a tendency towards a local or global optimum by, for example, progressively identifying an improved configuration such as to achieve a local maxima or minima, where improved configurations en route to such local maxima/minima can be employed as optima in scenarios where optimization algorithms are given determined stopping conditions based on, for example, duration or resource consumption. Such meaning will be apparent to those skilled in the art.

Thus in use the optimization function operates based on the consumption rules 208 to identify particular resources (from particular resource providers 204) and particular resource configurations for consumption by the consumer 202. The optimization function uses the references to the consumption rules 208 for the consumer 202 to determine the resource consumption options for the consumer 202 and applies the resource and (optional) expenditure constraints to the resource consumption options to determine a configuration of resource consumption so as to control expenditure of the consumer's 202 tradeable value 203. Access to the consumption rules 208 by the optimization function of the optimization rule 210 can be achieved in a number of ways. In one embodiment the optimization rule 210 is able to obtain, copy or read the consumption rules 208 such as by receiving or accessing the consumption rules 208 from the blockchain 206 as an arbitrary length byte array. Such access may be achieved by a function of the blockchain environment or database. Alternatively, each consumption rule 208 may be executable in a number of different modes such as: a first mode to validate resource consumption and effect expenditure of tradeable value 203; and a second mode to validate resource consumption without effecting expenditure of tradeable value 203 and return an extent of consumption that would be realized were the consumption to take place. A consumption 208 rule operating in such second mode of operation can provide an output (or return value) to a caller (such as the optimization function of the optimization rule 210) to indicate how much tradeable value 203 would be expended for the resource consumption (where, for example, zero expenditure can indicate a failure to validate the consumption). Thus in this way the optimization function of the optimization rule 210 is able to determine all or a subset of the consumption options for the consumer 202 as a basis for an optimization of resource consumption. Notably the process of obtaining relevant consumption options can, in some embodiments, be improved to provide greater efficiency and reduced overhead using various techniques. For example, a registry or database of consumption rules 208 for a consumer 202 can be generated and maintained by or for reference by the optimization rule 210. Furthermore, such a registry or database can be supplemented by summary information or metadata indicating particular resource types, resource configurations and/or cost information for the consumption rules 208 so as to provide a ready data structure on which to operate the optimization function. The identification of subsets of consumption rules 208 being applicable to the resource or expenditure constraints of the consumer 202 can also be achieved, such as by reference to a registry or database as described above, by shortlisting consumption rules or excluding inappropriate consumption rules and deduplicating consumption rules that overlap in extent (e.g. excluding from consideration duplicate consumption rules differing only by cost and/or provider, with a preference for retaining lower cost consumption rules).

Once consumption options are determined for the consumer 202 the optimization function is operable to determine a particular resource consumption configuration that satisfies the resource and (optionally) expenditure constraints defined in the optimization rule 210. Such an optimization function can employ any suitable optimization algorithm such as the algorithms considered in the paper "Optimization of Resource Provisioning Cost in Cloud Computing" (Chaisiri, Lee and Niyato, IEEE Transactions on Services Computing, Vol. 5, No. 2, April-June 2002). For example, the Benders decomposition algorithm ("Partitioning Procedures for Solving Mixed Variables Programming Problems", Benders, J., Numerische Mathematik, 4, 238-252, 1962) can be applied to solve a stochastic programming problem for minimizing the consumer's 202 total expenditure. Such an approach involves breaking down the optimization problem into smaller problems which can be solved independently or in parallel. Alternative optimization algorithms could be employed such as finitely terminating algorithms, convergent (iterative) algorithms and/or heuristic approaches; for example, gradient-based methods such as conjugate gradient methods, gradient descent, hill-climbing and the like. Alternatively, the simplex algorithm or combinatorial algorithms can be employed. Any such appropriate optimization algorithm operates on the basis of the resource consumption options identified by the optimization rule 210 and identifies a particular resource consumption configuration for the consumer 203, such as a configuration that minimizes expenditure of the tradeable value.

The determined resource consumption configuration includes an identification of resources to be consumed and the applicable consumption rule for each resource for consumption. In some embodiments the configuration further includes an extent or amount of each resource for consumption. On determination of a resource consumption configuration the optimization rule 210 effects the resource consumption by transacting with, or messaging, the applicable consumption rules 208 for the resource consumption configuration. In this way consumption of each resource is validated by the optimization rules 208 and expenditure of consumer's 202 tradeable value 203 is affected. To effect the resource provisioning or consumption itself the optimization rule 210 informs the consumer 202 and/or the appropriate resource providers 204 of the resource consumption configuration (at least insofar as it affects the particular providers 204) so that resource provisioning can take place.

The optimization rule 210 residing in the blockchain 206 can be invoked and executable in a number of different ways. In one embodiment the optimization rule 210 is executed solely by miners 212 in the blockchain environment in response to transactions or messages directed to the optimization rule 210. In an alternative embodiment dedicated, specialized or designated computing resource is employed for the execution of the optimization rule 210, such resource accessing the blockchain 206. For example, a computing system (whether distributed or not) such as a centralized, conventional, mainframe or supercomputer system can be dedicated to the execution of the optimization rule 210 without depending on the provision of transactions directed to the optimization rule 210 and without requiring miners 212 (such miners 212 typically requiring compensation as reward for their mining services in blockchain environments). The optimization rule 210 is intended to be invoked multiple times in order that the optimization function generates a new resource consumption configuration each time based on a new invocation context. The invocation context includes, for example, a quantity of tradeable value 203 remaining for the consumer; any updated or changed constraints; changes to consumption rules; resource costs determined via consumption rules; changes to resource availability or load; and other such characteristics as will be apparent to those skilled in the art. Thus the optimization rule 210 can be executed initially and execution is subsequently repeatedly.

In one embodiment an initial invocation of the optimization rule 210 is achieved by way of an initial resource consumption transaction directed to the optimization rule 210 and submitted by the consumer 202 to the blockchain 206. In such an embodiment the optimization rule 210 is invoked by miners 212 as part of processing the transaction. Alternatively, an initial invocation of the optimization rule 210 can be automatic on generation of the optimization rule 210 such that the optimization rule 210 executes initially on first definition. Such automatic invocation can be achieved, for example, where a centralized or dedicated computer system is employed for execution of the optimization rule 210. Subsequent invocations of the optimization rule 210 can take place periodically, such as repeatedly after an elapsed time period. Such repeated invocations can be achieved by repeated transactions directed to the optimization rule 210 and submitted to the blockchain 206 or, where a centralized or dedicated computer system is employed, by monitoring for elapse of a time period or the like. In one embodiment, each repeated invocation of the optimization rule 210 is determined based on one or more of: changes to the consumer's 202 quantity of tradeable value; and changes to the cost of consumption of one or more resources indicated in one or more consumption rules.

Thus in one embodiment invocation of the optimization rule 210 is triggered by the consumer 202 by way of a transaction submitted to the blockchain and directed to the optimization rule 210. Such a transaction will cause invocation of the logic of the optimization rule 210 by miners 212. For example, the consumer 202 can submit a transaction addressed to the optimization rule 210 for consumption of resource and the transaction can include data defining the resource and (optionally) expenditure constraints of the consumer. In some embodiments the transaction data also includes identification of or references to consumption rules 208 for the consumer 202. Thus in this way, in some embodiments, the optimization rule 210 can be populated by constraints and consumption rule references as part of its invocation by parameters provided with a triggering transaction. Alternatively, such constraints and references to consumption rules 208 can be defined for the optimization rule 210 when the optimization rule 210 is initially defined. Where the optimization rule 210 includes defined constraints and references, changes to the constraints and references can be achieved by replacing, updating, modifying or overwriting the optimization rule 210 in the blockchain 206.

Figure 5:
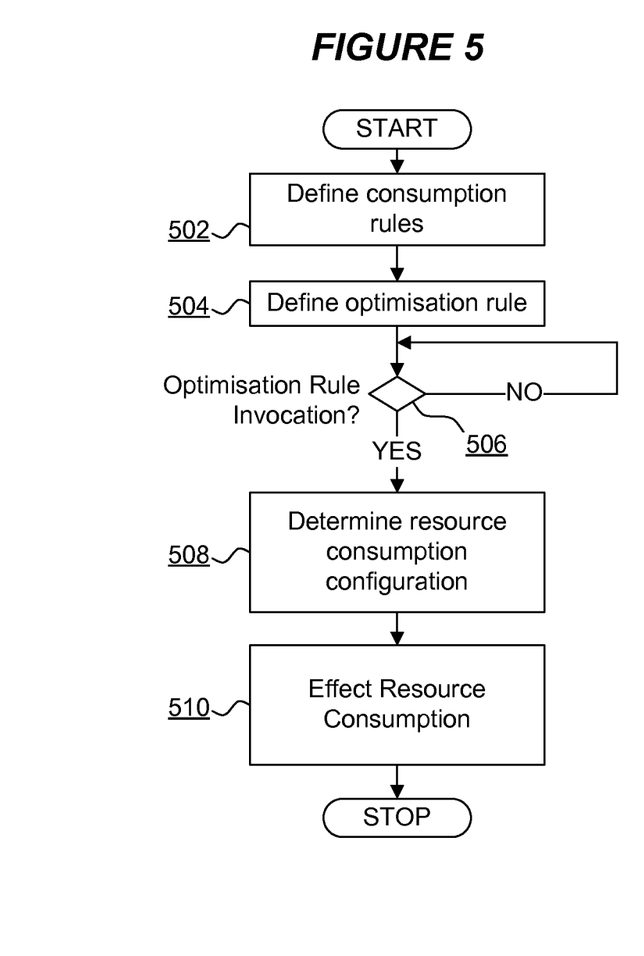
FIG. 5 is an exemplary flowchart of a method to provide computing resources for use by a consumer in accordance with an embodiment of the present disclosure.

FIG. 5 is an exemplary flowchart of a method to provide computing resources for use by the consumer 202 in accordance with an embodiment of the present disclosure. Prior to the method of FIG. 5 the consumer 202 has agreed resource provisioning with resource providers 204, such as by way of a resource provisioning negotiation interface between the consumer 202 and the providers 204 such that the providers agree to provide resources to the consumer 202. Such provisioning can include definitions or indications of configurations of resources and cost of resources or references to interfaces for determining such costs. Initially, at 502, the consumption rules 208 are defined by the consumer 202 based on the agreed resource provisioning and the consumption rules 208 are submitted to the blockchain 206 for validation and committal by miners 212. Subsequently the consumer 202 defines an optimization rule 504. The optimization rule 210 includes the optimization function. In one embodiment the optimization rule 210 further includes a definition of constraints (resource constraints and, optionally, expenditure constraints). In an alternative embodiment the optimization rule 210 includes logic for receiving constraints as parameters on invocation. The optimization rule 210 is submitted to the blockchain 206 for validation and committal by miners 212. Subsequently at 506 the method determines if the optimization rule 210 is invoked. Mechanisms for the invocation of the optimization rule 210 are discussed above. Where the optimization rule 210 is not invoked, the method loops. Where the optimization rule 210 is invoked the method proceeds to 508. At 508 the method determines one or more resource providers 204 for providing resources according to the consumer's 202 resource requirements. In some embodiments the consumer's 202 resource requirements are encoded as required resource types in the optimization rule 210 by way of the resource constraints defined therein. In some embodiments the consumer's 202 resource requirements are provided as required resource type parameters for the invocation of the optimization rule 210. Resource providers 204 are determined based on the consumption rules 208 and a current context of the consumer 202 and the resource providers 204 at 508. For example, the current context will include the available tradeable value for the consumer and the resource availability and cost reflected by the current consumption rules. Thus, at 508 the method determines a consumption configuration for the consumer 202 including an identification of particular resources from particular resource providers 204, an identification of a particular configuration of one or more of the resources and the identification of an extent of consumption of each type of resource. Notably, the configuration of resources can include an identification of a particular resource—e.g. a particular processor or network resource—or alternatively a configuration or characteristics of a resource, such as options, settings, qualities and the like. Further notably the extent of consumption of each type of resource can be limited—such that a particular amount, quantity or time period of resource is reserved or validated for consumption—or continuous such that consumption continues until a change to the resource configuration is affected. In one embodiment the extent of consumption is controlled by a duration between invocations of the optimization rule 210 such that each resource configuration applies only until replaced by a subsequently evaluated configuration by re-invocation of the optimization rule 210. The resource configuration thus constitutes the identification of multiple consumption rules 208 and the definition of parameters for the consumption rules 208 defining which and to what extent resources are to be consumed. Subsequently, at 510, the method effects resource consumption by invoking the identified consumption rules 208 with the parameters.

The invocation of consumption rules 208 can be effected by transactions to the blockchain 208 or alternatively by direct messages from the optimization rule 210 to each consumption rule. The execution of each consumption rule 208 involves the validation of parameters for the consumption of resource and effecting the consumption by expenditure of the consumer's 202 tradeable value 203 and, optionally, corresponding changes to tradeable value associated with service providers 204.

Thus, in this way embodiments of the present disclosure provide a decentralized resource consumption management mechanism where consumption of resource by a resource consumer 202 is continually optimized. The consumption rules 208 and optimization rule 210 are stored to the blockchain 206 such that they are not susceptible to repudiation and the state of the system of FIG. 3 can be reconstructed and validated by the network of miners 212. Resource provisioning is dynamically altered as state changes and resource provision is optimized based on expenditure of a tradeable value to ensure efficiency of resource provision within the constraints of the consumer's 202 requirements.

One blockchain-based environment suitable for the implementation of embodiments of the present invention is the Ethereum environment. The paper "Ethereum: A Secure Decentralised Generalised Transaction Ledger" (Wood, Ethereum, 2014) (hereinafter Ethereum) provides a formal definition of a generalized transaction based state machine using a blockchain as a decentralized value-transfer system.

In an Ethereum embodiment, a consumption rule 208 is implemented as an Ethereum account having associated logic for validating and effecting resource consumption so constituting Ethereum contracts (or smart contracts). Similarly, an optimization rule 210 is implemented as an Ethereum account having logic for determining an optimized resource configuration as an Ethereum contract. Each Ethereum account has an address by which it can be referenced for messaging and transactions. The consumer 202 creates the consumption rules 208 by individual Ethereum "create contract" transactions, each returning logic required for implementation of a consumption rule 208. Such transactions, when processed by miners 212, will result in the creation of consumption rule 208 contracts in the Ethereum environment reflected in the blockchain 206. Similarly, the consumer 202 creates the optimization rule 210 by an Ethereum "create contract" transaction returning the logic required for implementation of the optimization rule 210. The consumption rules are referenced by the optimization rule 210 contract by address and, in use, the optimization rule 210 contract is invoked by transactions submitted to the Ethereum blockchain 206 (or, alternatively, invoked automatically by a centralized or designated system accessing the blockchain 206). To identify resource consumption options the optimization rule 210 contract can read consumption rule 208 contracts directly from the blockchain 206 or alternatively messages can be passed to the consumption rule 208 contracts which operate in an optimization mode in which no consumption is affected. Notably, in Ethereum, the optimization rule 210 contract can communicate with the consumption rules 208 via message passing within the Ethereum virtual machine or via transactions to the blockchain 206. Where the optimization rule 210 is executed by an Ethereum virtual machine operating in a centralized or designated computer system (so avoiding, centralizing or controlling the consumption of gas value for its execution) then message passing to consumption rule 208 contracts will execute in the same Ethereum virtual machine so controlling the consumption of gas by their execution also.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method to provide allocation of one or more computing resources for use by a consumer computing component, each resource having a resource type and being provided by one or more resource providers, and the consumer having associated a quantity of tradeable value constraining an extent of resource consumption, the method comprising:

defining one or more consumption rules for each of the resource providers, each consumption rule being associated with the consumer and defining:
a type of resource, and
one or more tradeable values corresponding to costs for consumption of resource, each tradeable value being associated with a particular configuration of the resource, wherein the consumption rules are recorded in a blockchain data structure; and defining an optimization rule associated with the consumer and including:
a reference to each of the consumption rules associated with the consumer,
a definition of one or more constraints on characteristics of resources, and a consumption optimization function, wherein the optimization rule is recorded in the blockchain, and wherein a transaction is submitted to the blockchain to trigger consumption of one or more required types of resource and responsive to the transaction the optimization rule determines one or more resource providers for providing resources of the required resource types and, for each determined provider, the optimization function determines, based on the consumption rules, a particular configuration and an extent of consumption of each type of resource so as to control expenditure of the consumer's tradeable value.

2. The method of claim 1, wherein the optimization rule further includes one or more constraints on expenditure of the consumer's tradeable value.

3. The method of claim 1, wherein the optimization rule effects consumption of resource by causing invocation of one or more consumption rules for the consumer corresponding to the one or more determined resource providers.

4. The method of claim 3, wherein the invocation of each of the one or more consumption rules effects a change to the quantity of tradeable value of the consumer.

5. The method of claim 1, wherein each of the one or more consumption rules are executable by miner software components operating with the blockchain data structure.

6. The method of claim 1, wherein the one or more consumption rules are contracts defined in a smart contract blockchain system.

7. The method of claim 1, wherein the optimization rule is a contract defined in a smart contract blockchain system.

8. The method of claim 1, wherein the optimization rule responsive to the transaction is executed repeatedly so as to continuously adapt resource consumption.

9. The method of claim 1, wherein the optimization rule is executable by miner software components operating with the blockchain data structure.

10. The method of claim 1, wherein the optimization rule is executed by a central computer system.

11. The method of claim 1, wherein the determinations of the optimization rule responsive to the transaction are repeated based on one or more of: changes to the consumer's quantity of tradeable value; or changes to a tradeable value, in one or more consumption rules, corresponding to a cost for consumption of resource.

12. The method of claim 1, wherein a consumption rule evaluates a tradeable value for consumption of a resource with reference to an interface to a service provider for the resource, the interface providing a dynamic tradeable value rate for the resource.

13. A computer system to provide allocation of one or more computing resources for use by a consumer computing component, each resource having a resource type and being provided by one or more resource providers, and the consumer having associated a quantity of tradeable value constraining an extent of resource consumption, the system comprising:

a processor and a data store, wherein the processor is adapted to:
define one or more consumption rules for each of the resource providers, each consumption rule being associated with the consumer and defining:
a type of resource, and
one or more tradeable values corresponding to costs for consumption of resource, each tradeable value being associated with a particular configuration of the resource,
wherein the consumption rules are recorded in a blockchain data structure; and
define an optimization rule associated with the consumer and including:
a reference to each of the consumption rules associated with the consumer,
a definition of one or more constraints on characteristics of resources, and
a consumption optimization function, wherein the optimization rule is recorded in the blockchain,
wherein, a transaction is submitted to the blockchain to trigger consumption of one or more required types of resource and responsive to the transaction the optimization rule determines one or more resource providers for providing resources of the required resource types and, for each determined provider, the optimization function determines, based on the consumption rules, a particular configuration and an extent of consumption of each type of resource so as to control expenditure of the consumer's tradeable value.

14. A non-transitory computer-readable storage medium storing a computer program element comprising computer program code to, when loaded into a computer system and executed thereon, cause the computer to perform steps of the method as claimed in claim 1.

* * * * *